United States Patent
Easterly et al.

(10) Patent No.: US 8,443,301 B1
(45) Date of Patent: May 14, 2013

(54) INSPECTION REPORTING INCLUDING A 3D VEHICLE MODEL

(76) Inventors: Darek Easterly, Eagle Mountain, UT (US); David A. Boyle, Las Vegas, NV (US); David Leland Preece, Elk Ridge, UT (US); Jennifer Ada Real, Provo, UT (US); Leslie J. Silver, Henderson, NV (US); Marcus Isaac Daley, Highland, UT (US)

( * ) Notice: Subject to any disclaimer, the term of this patent is extended or adjusted under 35 U.S.C. 154(b) by 53 days.

(21) Appl. No.: 13/245,760

(22) Filed: Sep. 26, 2011

Related U.S. Application Data

(60) Provisional application No. 61/386,935, filed on Sep. 27, 2010.

(51) Int. Cl.
*G06F 3/048* (2006.01)

(52) U.S. Cl.
USPC .......................................................... 715/848

(58) Field of Classification Search .................. 715/575, 715/772, 848, 849, 850, 852
See application file for complete search history.

(56) References Cited

U.S. PATENT DOCUMENTS

| | | | |
|---|---|---|---|
| 4,445,185 A | 4/1984 | Davis, Jr. et al. | |
| 5,432,904 A | 7/1995 | Wong | |
| 5,839,112 A | 11/1998 | Schreitmueller et al. | |
| 6,185,540 B1 * | 2/2001 | Schreitmueller et al. | 705/4 |
| 6,308,120 B1 | 10/2001 | Good | |
| 6,397,131 B1 | 5/2002 | Busch et al. | |
| 6,470,303 B2 * | 10/2002 | Kidd et al. | 703/8 |
| 6,609,050 B2 * | 8/2003 | Li | 701/29.6 |
| 6,611,725 B1 | 8/2003 | Harrison et al. | |
| 6,728,685 B1 | 4/2004 | Ahluwalia | |
| 7,069,192 B1 | 6/2006 | Freitag | |
| 7,209,930 B2 | 4/2007 | Maeda et al. | |
| 2002/0128985 A1 * | 9/2002 | Greenwald | 705/400 |
| 2004/0193441 A1 | 9/2004 | Altieri | |
| 2006/0031041 A1 * | 2/2006 | Afshar et al. | 702/184 |
| 2007/0198117 A1 | 8/2007 | Wajihuddin | |
| 2008/0294401 A1 | 11/2008 | Tsin et al. | |
| 2009/0197228 A1 * | 8/2009 | Afshar et al. | 434/219 |
| 2009/0234480 A1 | 9/2009 | Marion | |

FOREIGN PATENT DOCUMENTS

WO  WO 2008/003561  1/2008

OTHER PUBLICATIONS

Delcam, PowerINSPECT—Complex 3D Part Inspection, http://www.powerinspect.com/general/powerinspect.asp, Copyright 2010, retrieved on Mar. 26, 2010.

* cited by examiner

*Primary Examiner* — Thanh Vu
(74) *Attorney, Agent, or Firm* — Knobbe Martens Olson & Bear, LLP

(57) ABSTRACT

In one embodiment, a visual reporting system generates a 3-dimensional (3D) interactive vehicle inspection report comprising 3D model data and inspection data for a particular vehicle. The inspection data, such as recommended repair items, are associated with graphical vehicle sections in the 3D model. Further, additional inspection data, such as instructional videos or inspection photographs, can be provided to a user desiring additional detail. By providing an interactive visual representation of inspection data, the 3D inspection report provides a report that can be customized to provide different levels of detail to different users. In addition, the 3D model can provide a visually compact summary of the inspection data by marking on the 3D model the repair items for the vehicle. Use of the 3D inspection report can raise the likelihood that the vehicle owner understands the need for repair, leading to more repair orders for repair facilities.

18 Claims, 9 Drawing Sheets

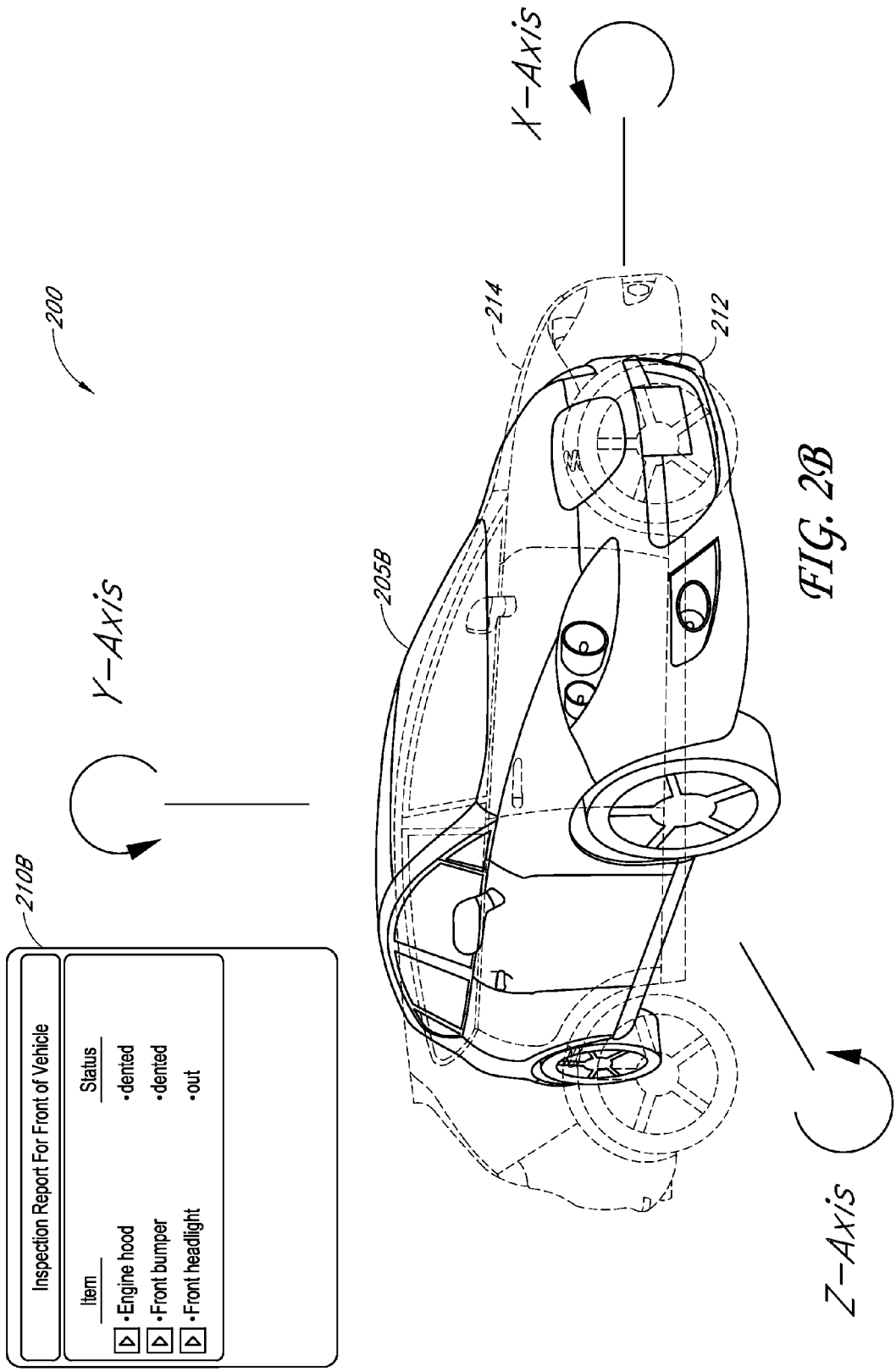

INSPECTION REPORTING INCLUDING A 3D VEHICLE MODEL

CROSS-REFERENCE TO RELATED APPLICATIONS

This application claims the benefit of priority under 35 U.S.C. §119(e) of U.S. Provisional Application No. 61/386,935, filed Sep. 27, 2010, titled INSPECTION REPORTING INCLUDING A 3D VEHICLE MODEL, the entire contents of which are hereby incorporated by reference herein.

BACKGROUND

This disclosure generally relates to systems and methods for reporting and/or providing information associated with an automobile inspection and, more particularly, providing automobile inspection information including a 3-dimensional (3D) automobile model.

DESCRIPTION OF THE RELATED ART

Automobiles have many components and systems that function alone, or in coordination, to allow proper operation of the vehicle. Examples of such systems and components may include, but are not limited to, brake systems, emissions systems, transmission systems, belts, hoses, fluid levels, tires, etc. In order to ensure that proper operation of the vehicle is maintained, vehicle inspections and repairs are typically recommended by the vehicle manufacturer at selected intervals in order to check the operation of the vehicle's many components and systems.

In order to assist in reporting the inspection and potential repairs, static vehicle inspection reports are often utilized. Typically, a vehicle inspection report is a paper report containing a list of vehicle components, with components needing repair marked on the report. In one example, such a report may be generated by individual automobile repair facilities for customers. In this manner, a customer can be advised of the status of a variety of systems and/or components.

Unfortunately, these reports can be difficult to understand or may not convey to the customer why a particular repair is recommended and/or necessary. For example, the customer might not understand where a part is found, what a part does, or why it needs to be repaired. In addition, as the reports are static, they cannot provide customized levels of detail to the customer. Too much detail and a customer may be confused, too little, and the customer may choose not to proceed with the repair. Thus, these static reports can potentially be unconvincing to the customer regarding the need for a repair, thereby reducing the amount of potential business for repair facilities.

SUMMARY

In one embodiment, a visual reporting system generates a 3-dimensional (3D) interactive vehicle inspection report comprising 3D model data and inspection data for a particular vehicle. The inspection data, such as recommended repair items, are associated with graphical vehicle sections in the 3D model. Further, additional inspection data, such as instructional videos or inspection photographs, can be provided to a user desiring additional detail. By providing an interactive visual representation of inspection data, the 3D inspection report provides a report that can be customized to provide different levels of detail to different users. In addition, the 3D model can provide a visually compact summary of the inspection data by marking on the 3D model the repair items for the vehicle. Use of the 3D inspection report can raise the likelihood that the vehicle owner understands the need for repair, leading to more repair orders for repair facilities.

BRIEF DESCRIPTION OF THE DRAWINGS

FIG. 2B illustrates the 3D report of FIG. 2A rotated to another view of the vehicle model;

DETAILED DESCRIPTION

Embodiments of the disclosure will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the systems and methods herein described.

The terms "vehicle" and "automobile," as used herein, may comprise any vehicle, automobile, airplane, tractor, boat, or other motorized device, as well as other types of devices that may require inspections and/or repairs, such as electronic devices, including computers and computerized devices, for example. Thus, any reference herein to an automobile or vehicle should be construed to cover any other apparatus or device.

Figure 1:
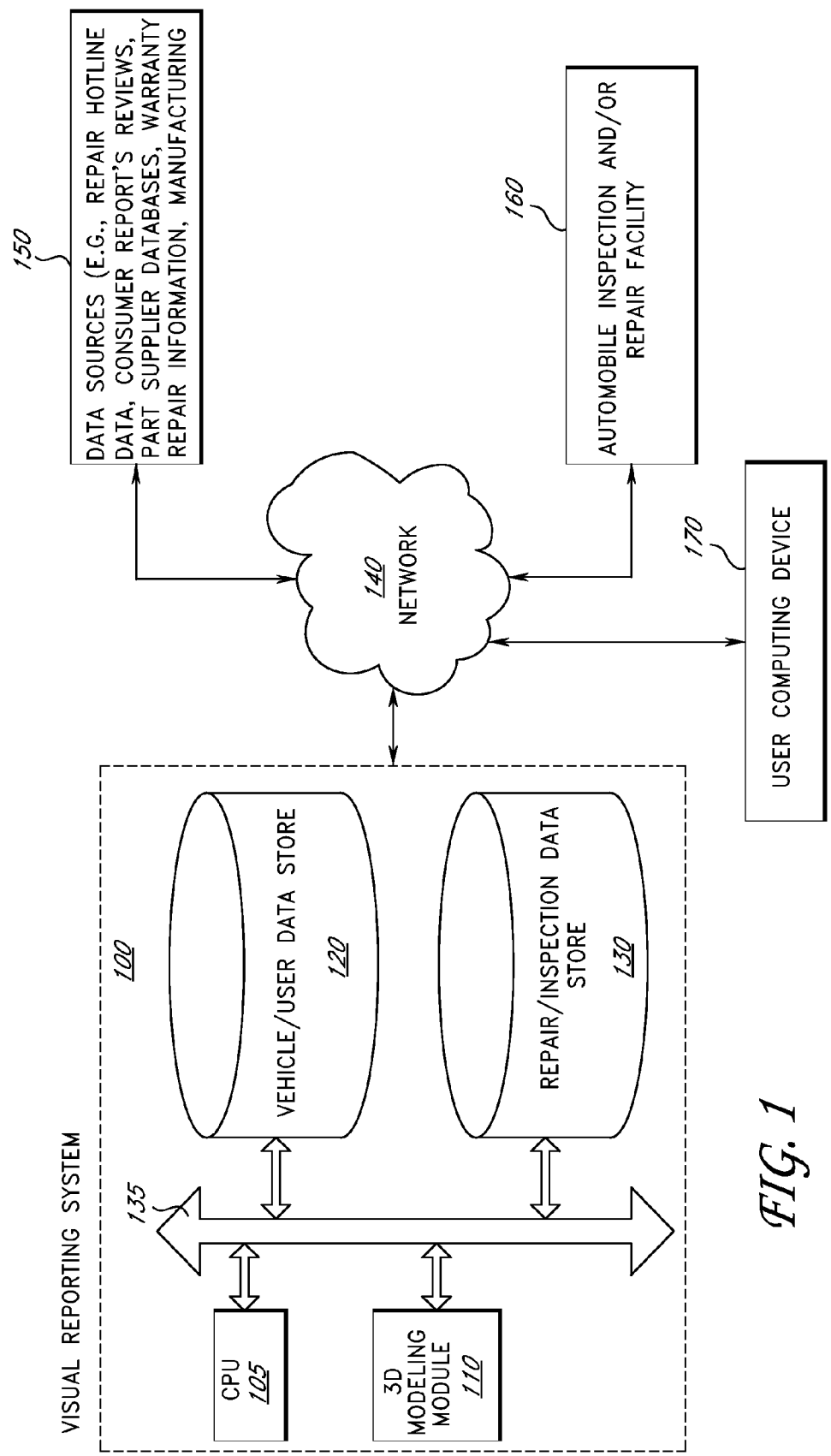
FIG. 1 is a block diagram of a visual reporting system that is configured to generate interactive 3D inspection reports.

FIG. 1 is a block diagram of a visual reporting system 100 that is configured to generate interactive 3D inspection reports. The visual reporting system 100 can include one or more CPUs 105, a 3D modeling module 110 for generating and/or associating data with a 3D model, a vehicle/customer data store 120 for vehicle and/or customer related data and a repair/inspection data store 130 for storing repair related data. The components can be connected via a communications medium 135, such as a system bus or network. The visual reporting module components can be part of a single computing device or part of one or more computing systems comprising one or more computing devices.

The visual reporting system 100 can also include a data interface for receiving and/or transmitting data over a communications link. The communications link can be via a wired and/or wireless communication link, such as Ethernet, Bluetooth, 802.11a/b/g/n, infrared, universal serial bus (USB), IEEE 1394 interface, or the like. The communications link can connect to a network 140, such as LANs, WANs, and/or the Internet, for communicating with one or more data sources 150, one or more automobile inspection and/or repair facilities 160 (referred to herein as simply the "repair facility 160") and one or more user computing devices 170. The visual reporting system 100 can also include a web server for providing web pages.

In an example scenario, a customer obtains an inspection of his vehicle from a repair facility 160. A technician inspects the vehicle and notes any items needing repair and/or further inspection. The technician provides the identified items via an interface to the visual reporting system 100, for example, via a software application interface, web page, or the like. The technician can also provide customer and/or vehicle identification data, such as name, address, VIN number, vehicle mileage, vehicle description and/or the like. The technician can also provide additional inspection data, such as pictures and/or video of the inspected items, evaluations of the inspected items, repair recommendations, estimates of repair costs, status of the inspected item, customer decisions regarding suggested repairs, and/or updates on previously recorded inspection items from past inspections.

After receiving the inspection information, the visual reporting system 100 can generate a 3D report for inspection by a user, such as a customer, technician, repair facility employee, claims adjustor, insurance company or the like. In one embodiment, the visual reporting system 100 uses the vehicle identification data to generate or obtain 3D data representative of a 3D model corresponding to the vehicle type. For example, the visual reporting system 100 can generate or obtain a specific 3D model, for example, a 2010 silver Toyota Camry, to match the specific vehicle inspected. The visual reporting system 100 can also use a generic vehicle model to represent the vehicle, such as a sedan model, truck model, SUV model, automobile model, boat model or the like.

The visual reporting system 100 then associates inspection data from the repair facility 160 with portions of the selected 3D model. For example, items needing repair may be flagged or otherwise indicated on the 3D model. Further, additional inspection data can be associated with portions of the 3D model, such as cost estimates, time estimates, instructional videos, decision options, current status and/or the like.

The visual reporting system 100 can transmit or provide the 3D model report to one or more user computing devices 170. The user computing devices 170 can be a desktop personal computer (PC), a laptop computer, a cellular phone, personal digital assistant (PDA), a kiosk and/or the like. For example, the customer, using his mobile computing device (e.g. a cell phone or tablet) or PC at home or at work, obtains the 3D report from the visual reporting system 100 using a visual interface such as a web browser or other software application. The customer can view the 3D model in the report and manipulate the model to focus on particular inspection items. The customer can expand inspection items to get additional detail, for example, via popup window, in order to learn more about the inspection items. For example, the customer could view photos and/or videos of the actual inspection item, instructional videos which can discuss the need for the repair or the consequences of failing to repair the time, view repair estimates, and/or other inspection details.

In one embodiment, the customer can rotate the 3D model to focus on a particular section, zoom in to a particular area, cause one or more vehicle areas to become transparent in order to view obscured areas, cause a section of the report to expand with more details and/or cause a popup window to appear with more details. Additional details of the 3D model and user interface are described below. By being able to interact with the report and learn additional detail, if desired, the customer can become more educated about recommended repairs and will be more likely to be comfortable with getting the repair, thus increasing customer "buy-in" and increasing business with repair facilities. With paper reports, the buyer may not necessarily understand the need for the repair or otherwise mistrust the repair facility 160 recommendations as the customer does not have enough information to make an educated decision.

Referring back to FIG. 1, the visual reporting system 100 can aggregate or retrieve data from one or more data sources 150, which may be accessed through network 140 connections, such as via an Internet connection. The data sources 150 may include data from one or more of repair hotlines, consumer report data providers, automobile parts suppliers, warranty repair providers, manufacturing data, industry articles, and many other providers of data that are relevant to inspections and/or repairs of vehicles. Data from these sources can be integrated into the 3D report generated by the visual reporting system 100.

In one embodiment, the repair facility 160 comprises a data store that stores data associated with vehicle and/or customer, inspection, repairs, and/or repair results, for example, that are performed or observed at the repair facility 160. In one embodiment, the repair facility 160 comprises an automobile repair shop, such as that of a dealership, fleet maintenance depot, or independent mechanic. In another embodiment, the repair facility 160 may comprise an airplane hanger for an airline that performs repairs on a vehicle.

The visual reporting system 100 can be located in individual repair facilities, such as the repair facility 160, or may be a centralized or nodal visual reporting system 100 in communication with multiple repair facilities 160. In one embodiment, a visual reporting system 100 operator services multiple repair facilities 160 and provides 3D reports to users or customers of the repair facilities 160. Users can log in to a web page provided by the visual reporting system 100 in order to retrieve a 3D report of their vehicle.

In addition to transferring relevant recommendation and repair data via the network 140, certain data sources 150 may transmit data to the visual reporting system 100 via other means, such as on a tangible, moveable media, such as DVD, CD-ROM, flash memory, thumb drive, etc., that may be delivered to an administrator of the visual reporting system 100. In other embodiments, the visual reporting system 100 is in communication with fewer or more devices than are illustrated in FIG. 1. In one embodiment, certain functionalities described herein with respect to the visual reporting system 100 are performed, partly or completely, by other device, such as computing devices of one or more data sources 150, computing devices of the repair facility 160, and/or user computing devices 170.

In the embodiment of FIG. 1, the visual reporting system 100 includes any combination of software, firmware, and hardware. For example, the visual reporting system 100 may include only software code that may be executed by suitable computing devices (e.g., a computer or server). Alternatively, the visual reporting system 100 may include a computing device, such as a computing device having one or more central processing units ("CPU"), which may each include conventional microprocessors or any other processing unit. In this embodiment, the visual reporting system 100 further includes one or more memory devices, such as random access memory ("RAM") for temporary storage of information and/or a read only memory ("ROM") for permanent storage of information, and one or more mass storage devices, such as hard drives, diskettes, or optical media storage devices. In one embodiment, the components of the visual reporting system 100 are in communication via a standards based bus system, such as bus systems using Peripheral Component Interconnect (PCI), Microchannel, SCSI, Industrial Standard Architecture (ISA) and Extended ISA (EISA) architectures and others. In certain embodiments, components of the visual reporting system 100 communicate via one or more networks, such as a local area network that may be secured.

In general, the term "module," as used herein, refers to logic embodied in hardware or firmware, or to a collection of software instructions, possibly having entry and exit points, written in a programming language, such as C, C# or C++. A software module may be compiled and linked into an executable program, installed in a dynamic link library, or may be written in an interpreted programming language such as BASIC, Perl, or Python. It will be appreciated that software modules may be callable from other modules or from themselves, and/or may be invoked in response to detected events or interrupts. Software instructions may be embedded in firmware, such as an EPROM. The modules described herein are preferably implemented as software modules, but may be represented in hardware or firmware. Moreover, although in some embodiments a module may be separately compiled, in other embodiments a module may represent a subset of instructions of a separately compiled program, and may not have an interface available to other logical program units.

In one embodiment, the visual reporting system 100 comprises a server based system. In other embodiments, the visual reporting system 100 may comprise any other computing device, such as a computing device or server that is IBM, Macintosh, or Linux/Unix compatible. In another embodiment, the visual reporting system 100 comprises a desktop personal computer (PC), a laptop computer, a cellular phone, personal digital assistant (PDA), or a kiosk, for example.

The visual reporting system 100 is generally controlled and coordinated by operating system software, such as server based software. In other embodiments, the visual reporting system 100 comprises modules that execute one or more other operating systems, such as Windows 95, Windows 98, Windows NT, Windows 2000, Windows XP, Windows Vista, Windows 7, Windows Server, Linux, SunOS, Solaris, PalmOS, Blackberry OS, or other desktop or server operating systems. In Macintosh systems, the operating system may be any available operating system, such as MAC OS X. In other embodiments, the visual reporting system 100 may be controlled by a proprietary operating system. Conventional operating systems control and schedule computer processes for execution, perform memory management, provide file system, networking, and I/O services, and provide a user interface, such as a graphical user interface ("GUI"), among other things.

The visual reporting system 100 can include one or more commonly available input/output (I/O) devices and interfaces (not shown), such as a keyboard, mouse, touchpad, speaker, and printer. In one embodiment, the I/O devices and interfaces include one or more display device, such as a monitor, that allows the visual presentation of data to a user. More particularly, a display device provides for the presentation of GUIs, application software data, and multimedia presentations, for example. The visual reporting system 100 may also include one or more multimedia devices, such as speakers, video cards, graphics accelerators, and microphones, for example.

Figure 2A:
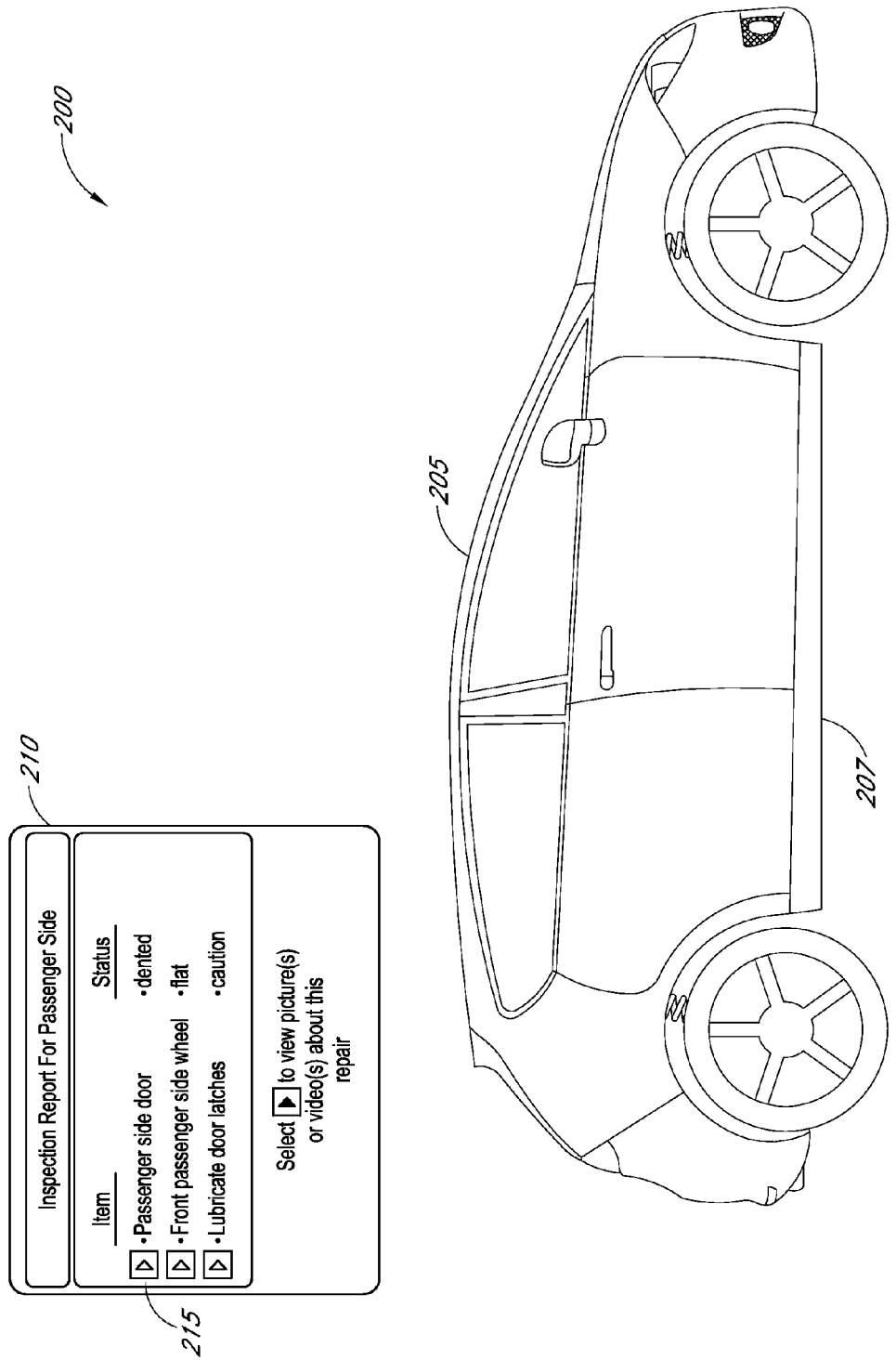
FIG. 2A illustrates an embodiment of a 3D report displaying a side view of a vehicle model.

FIG. 2A illustrates an embodiment of a user interface 200 depicting an inspection report 210 and a rendering (or "view") 205 of a 3D vehicle model. The 3D model can be rotated by the user to display renderings of the vehicle from various other angles and vantage points.

In one embodiment, the inspection report 210 displays, for example, items needing repair. The inspection report can display a list of vehicle items, item status, and links 215 to audio, video, pictures or other data associated with the repair item, such as instructional videos or inspection pictures. Providing an instructional video allows the user to learn about the importance and/or need for a particular repair. Likewise, providing inspection photos allows the user to see and recognize the problem on the vehicle. Providing such information can increase the believability of the report to a user.

In one embodiment, the inspection report displays repair items corresponding to the current view of the vehicle 205. For example, the inspection report can display items corresponding to vehicle items located on the displayed view or located proximate to the vehicle areas in the displayed view, which, in FIG. 2A, is the passenger or right side of the vehicle. In one embodiment, the listed items on the inspection report 210 change as the user rotates the 3D rendering 205. The user interface 200 may also use an inspection report 210 having portions that are static or non-interactive. In one embodiment, the inspection report 210 can provide additional detail about a repair and/or inspection item (referred to herein as simply the "repair item") in response to a selection by the user. For example, the inspection report 210 could display groups of vehicle components, such as engine, exterior, interior, fuel system, or the like in a first configuration, and allow a user to expand the report to view individual vehicle components that are part of the group.

In one embodiment, areas on the vehicle or individual items on the vehicle can be shaded, highlighted, colored or otherwise marked. Such markings can be used to indicate the particular vehicle items for which repairs are recommended. Different markings can be used to indicate the degree of the problem or the necessity of repair. For example, immediately required repairs could be colored red while future recommended repairs could be marked orange. In one embodiment, the user interface 200 can include such markings on the vehicle rendering 205 or item currently selected by the user on the inspection report 210.

In one embodiment, the rendering 205 comprises multiple graphical vehicle sections corresponding to physical vehicle sections of the inspected vehicle. Individual repair items for vehicle components of the inspected vehicle can be associated with particular graphical vehicle sections based on the proximity of the vehicle component to the physical vehicle section corresponding to the graphical vehicle section. For example, a radiator located in the engine bay can be associated with an engine compartment vehicle section. Depending on the level of detail of the model, the graphical vehicle section can correspond to areas of the vehicle, component groupings, or individual components. For example, the vehicle section could correspond to the engine compartment or to individual components such as the radiator or timing belt.

In one embodiment, a selection by the user of a repair item on the inspection report 210 causes updating of the vehicle rendering 205 to emphasize the repair item by, for example, rotating the vehicle model to display the repair item, zooming into the repair item, and/or marking or further marking the repair item.

FIG. 2B illustrates the user interface of FIG. 2A with the rendering 205B illustrating a different view of the vehicle than rendering 205 in FIG. 2A. The vehicle model can be rotated along any axis in order to display other views of the vehicle. In FIG. 2B, the rendering 205B displays a front perspective view 212 of the vehicle model after being rotated from the side view 214 of FIG. 2A. Depending on the implementation, the rendering may or may not display intervening views of the vehicle as the 3D model is rotated from the side view 214 to the front perspective view 212. In FIG. 2B, the inspection report 210B, in response to the rotation of the 3D model, displays repair items corresponding to the front perspective view 212 of the vehicle. For example, rotating to a front view or front perspective view 212 of the vehicle model can cause the inspection report 210 to display repair items located on the front of the vehicle 205, such as engine components, the front bumper, the headlights, or other items located proximate to the front of the vehicle.

Figure 2C:
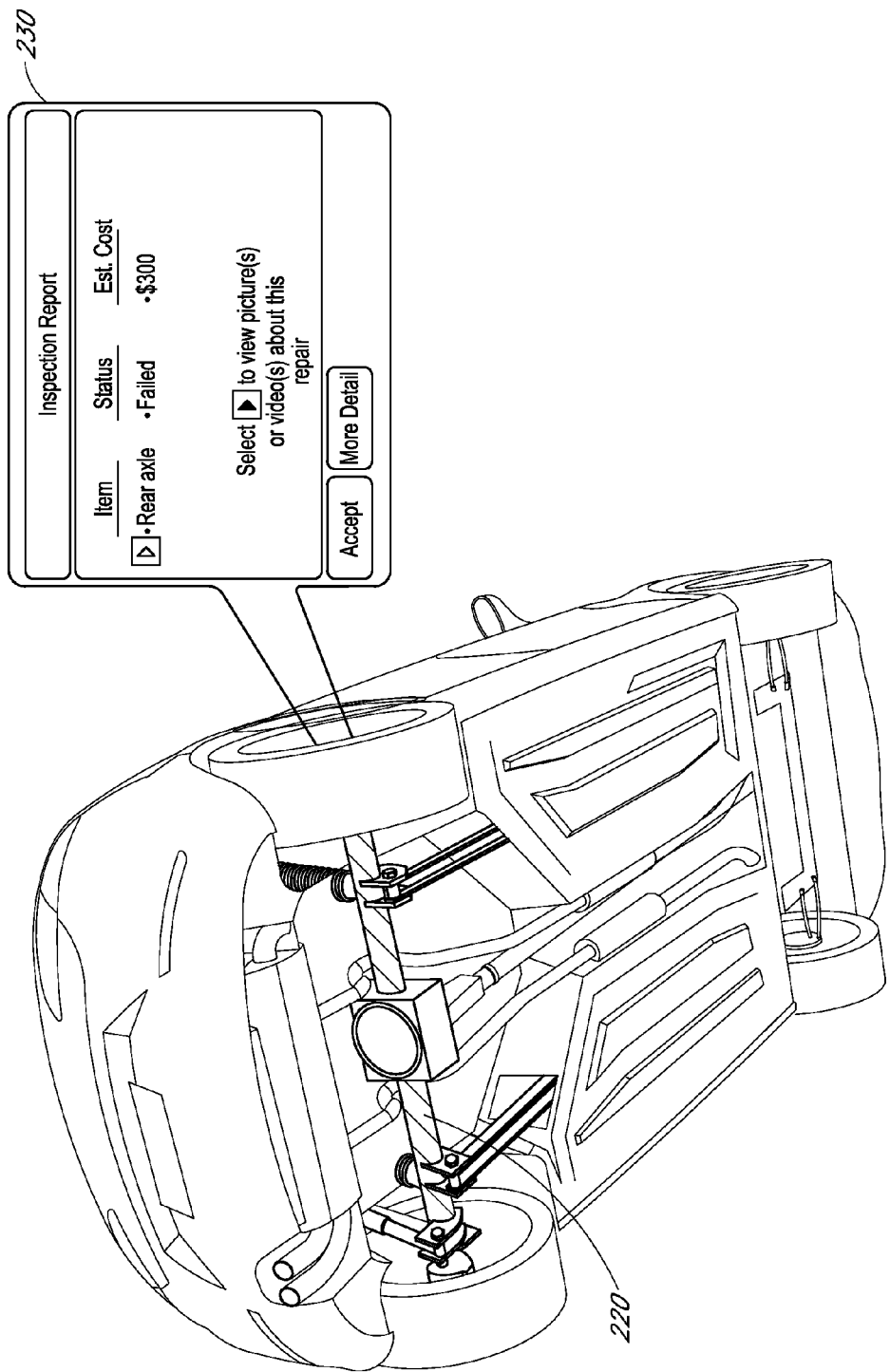
FIG. 2C illustrates the 3D report of FIG. 2A displaying a third view of the vehicle model.

FIG. 2C illustrates the user interface of FIG. 2A displaying a third view of the vehicle model, the view displaying an undercarriage of the vehicle 205. In one embodiment portions of the vehicle item 220 may be marked via shading, color, highlighting, animation, or other graphical indication to indicate that additional information is available or that a user-interaction with the marked portion is possible. In one embodiment, a selection by the user of a marked vehicle item 220 causes a popup window 230 to display details about the indicated item. For example, in FIG. 2C, the vehicle rendering provides additional details about the rear axle repair item upon a selection by the user of the rear axle on the vehicle model. In some embodiments, the popup provides information on the status, estimated cost, pictures and/or videos related to the repair item. In some embodiments, a user can input a decision in the popup on whether to allow the repair, for example, by selecting an "accept" button. In some embodiments, further details may be shown to the user, for example, if the user selects a button for "more detail."

Figure 3A:
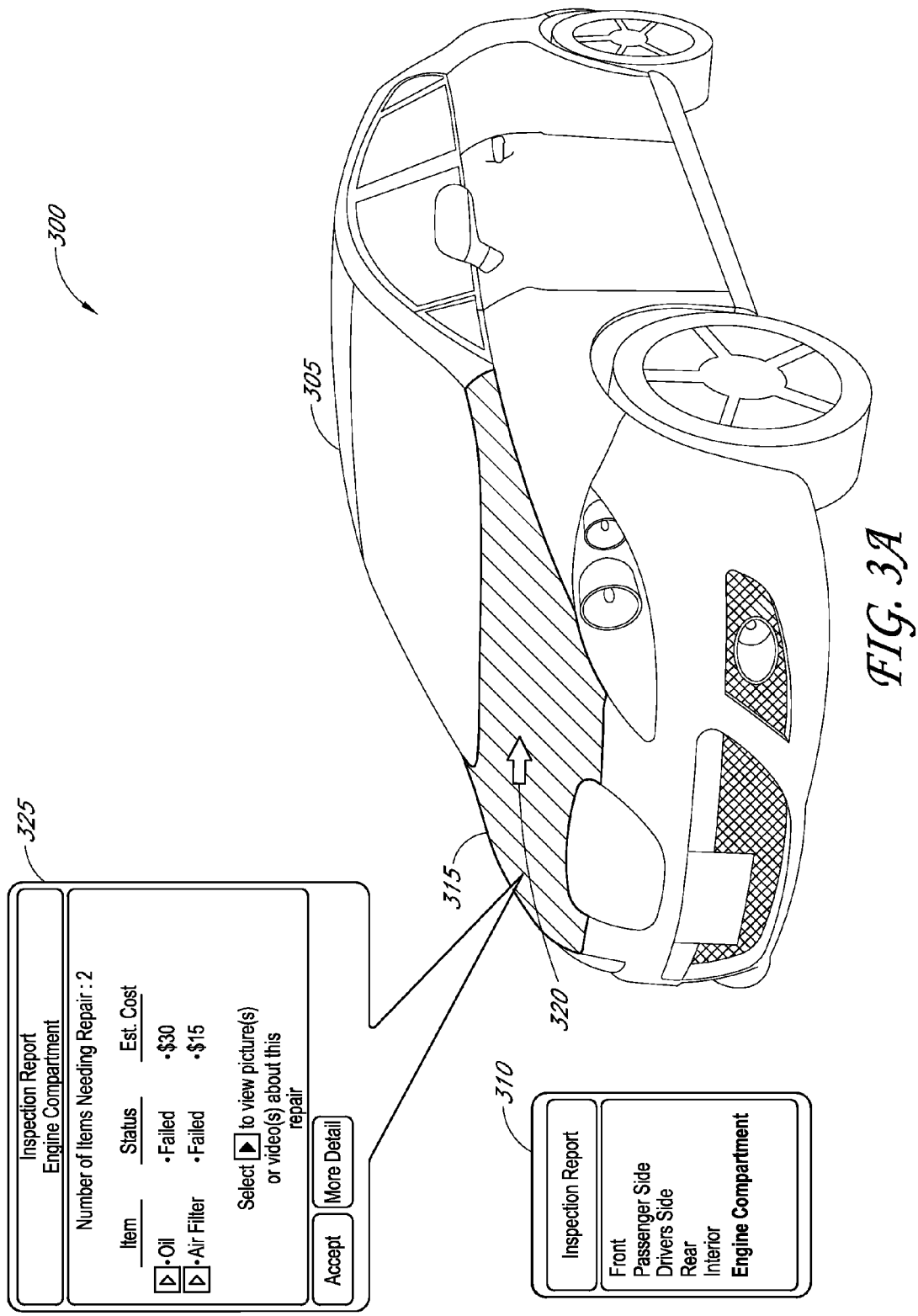
FIG. 3A illustrates an embodiment of the interactive 3D vehicle inspection report including a 3D image and an inspection report listing.

FIG. 3A illustrates an embodiment of a user interface 300 including a 3D rendering 305 and an inspection report component listing 310. In FIG. 3A, the inspection report 325 illustrates repair items associated with an engine section of the vehicle, which includes two repair items. The engine section 315 on the 3D rendering 305 is shaded to indicate that the engine section 315 is currently selected and that the inspection report 325 is currently displaying information regarding repairs items in the engine section 315. In other embodiments, the currently selected vehicle section or component may be indicated with other markings or in any other manner. In one embodiment, the inspection report 325 appears in the form of a pop-up, for example, in response to the user hovering a mouse pointer 320 over the indicated section. In one embodiment, the popup appears if the user selects the indicated section, for example, by clicking on the section by using a mouse pointer 320 or by tapping the section using a touch screen. The inspection report 325 can include a text message as well as additional information related to the repair item, such as links, pictures, videos, or the like.

The inspection report listing 310 can provide a listing of vehicle sections. In one embodiment, the inspection report component listing 310 lists sections of the vehicle and indicates which sections have repair items, for example, by highlighting, bolding, or marking the vehicle section. In one embodiment, the inspection report listing 310 only lists vehicle sections and/or items having associated repair items. In one embodiment, if a user selects a vehicle section from the component listing 310, the 3D model rotates to the orientation corresponding to the repair items associated with the selected vehicle section and/or specific repair items associated with the selected vehicle section. For example, if the engine section is selected, the 3D model may rotate so that the rendering 305 is of the front of the vehicle. In one embodiment, the listed vehicle sections on the inspection report list 310 corresponds to the sections and/or repair items displayed in the current orientation of the 3D model.

Figure 3B:
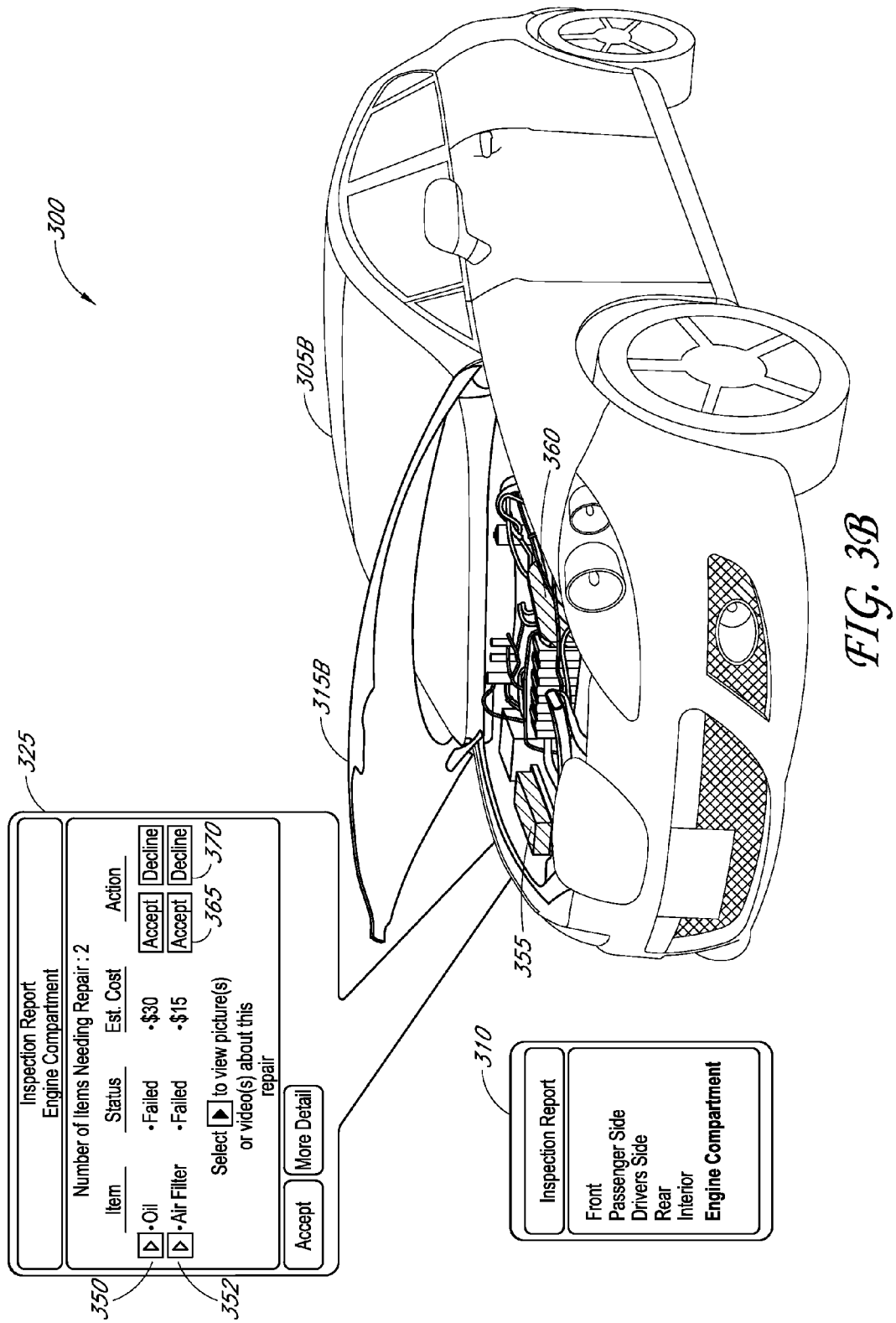
FIG. 3B illustrates an embodiment of the interactive 3D inspection report wherein the 3D model responds to a user selection to better display a repair item.

FIG. 3B illustrates an embodiment of the interactive 3D user interface 300 wherein the 3D rendering 305B illustrates details of a vehicle component, such as in response to user input and in order to better display a repair item. In FIG. 3B, the rendering 305S has been changed (over the rendering 205 in FIG. 3A) to reflect details of a repair item selected by the user. For example, if the user selects engine repair items 350, 352 (such as by clicking on icons associated with the items or any part of the row of text associated with the items), the rendering can be updated to show the hood 315B lifted in order to display the engine components, 355, 360. In another example, sections of the vehicle can turn transparent or disappear in order to show, for example, interior spaces or otherwise obscured repair items or vehicle components. In one embodiment, the inspection report 325 proposes possible actions that a user can select regarding the repair items, such as accepting or denying a repair, saving the repair for a future visit, requesting additional information about the repair or scheduling a reminder about the repair. In one embodiment, the user selects the desired action using a button (e.g., an "Accept" button 365 and/or a "Decline" button 370), an input field, a checkbox or other user interface input. The user can select the desired action for individual or groups of repair items.

Figure 4:
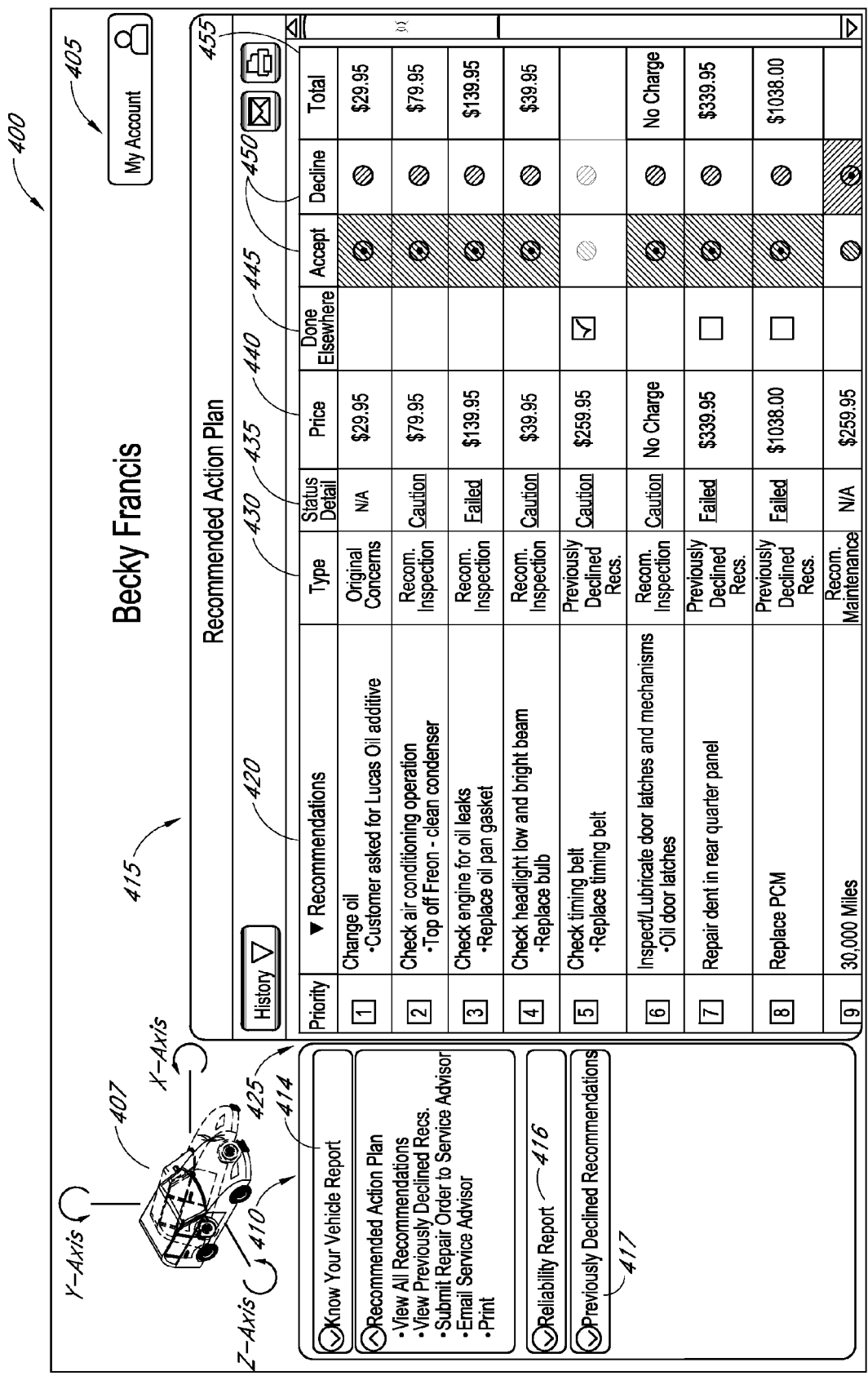
FIG. 4 illustrates another embodiment of the interactive 3D report incorporated into a web page.

FIG. 4 illustrates another embodiment of an interactive 3D user interface 400 incorporated into a web page. In this embodiment, the user interface 400 allows users to login to their account by selecting the MyAccount button 405, in order to view a report associated with an inspection of their vehicle. In other embodiments, the user may be provided with a link to the interactive 3D user interface, such as via email or text message (e.g., Short Message Service (SMS) or Multimedia Messaging Service (MMS)), and may not be required to establish an account. In one embodiment, the interactive 3D user interface 400 provides multiple sub-menus or report sections 410 for reporting inspection results. For example, the interactive 3D user interface 400 can include a 3D model rendering 407, sections providing descriptive details about the vehicle, such as mileage, VIN number, make, model, year or the like. The size of the rendering 407 may be larger or smaller than depicted in FIG. 4. The interactive 3D user interface 400 can also include a vehicle report 414, recommended action plan 415, a reliability report 416, and/or a history of inspections or repairs, such as previously declined recommendations 417. In one embodiment, the interactive 3D user interface 400 allows the user to email reports to others, print out reports, and/or view a history of previous reports.

In one embodiment, the recommended action plan 415 includes a list of recommended repairs or inspections 420 for the vehicle. Examples of such repairs or inspections 420 are oil changes, checking air conditioning operation, checking oil leaks, replacing/checking headlight bulbs, checking/replacing timing belts, inspecting/lubricating door latches and mechanisms, repairing dents, replacing computer components such as PCMB, ECMs, or ECUs, scheduled maintenance, and/or other types of repairs or inspections. Repairs may be ranked or prioritized, for example, by using a numerical ranking 425 or an ordering by severity of the problem. Additional details can also be provided. For example, the type of the repair 430 can be specified, such as a previously declined inspection, recommended maintenance, or new finding. In another example, the recommended action plan 415 provides a status of the component 435, such as failed or failing. The action plan 415 can also list the price 440 and/or whether the repair was done at another facility or where the repair was done 445. In addition, the recommended action plan 415 can provide user input selections 450, such as "accept" or "decline" boxes, radio buttons, fields or the like for the user to select whether to approve or decline the recommended repair. The action plan 415 can also provide a tally or total 455 of the costs of selected repairs in order to aid the user in making repair decisions. In one embodiment, the user can initiate fulfillment of the accepted repair items via the user interface, for example, by selecting a "Submit" or "Buy" button or other user-interface input. In one embodiment, the user may not even need to speak with a repair technician or service personnel in order to initiate the repair of the user's vehicle. Using the user interface 400, the user can review the repair information and initiate repair actions, such as selecting items to be repaired, from any location or any computing device.

Figure 5:
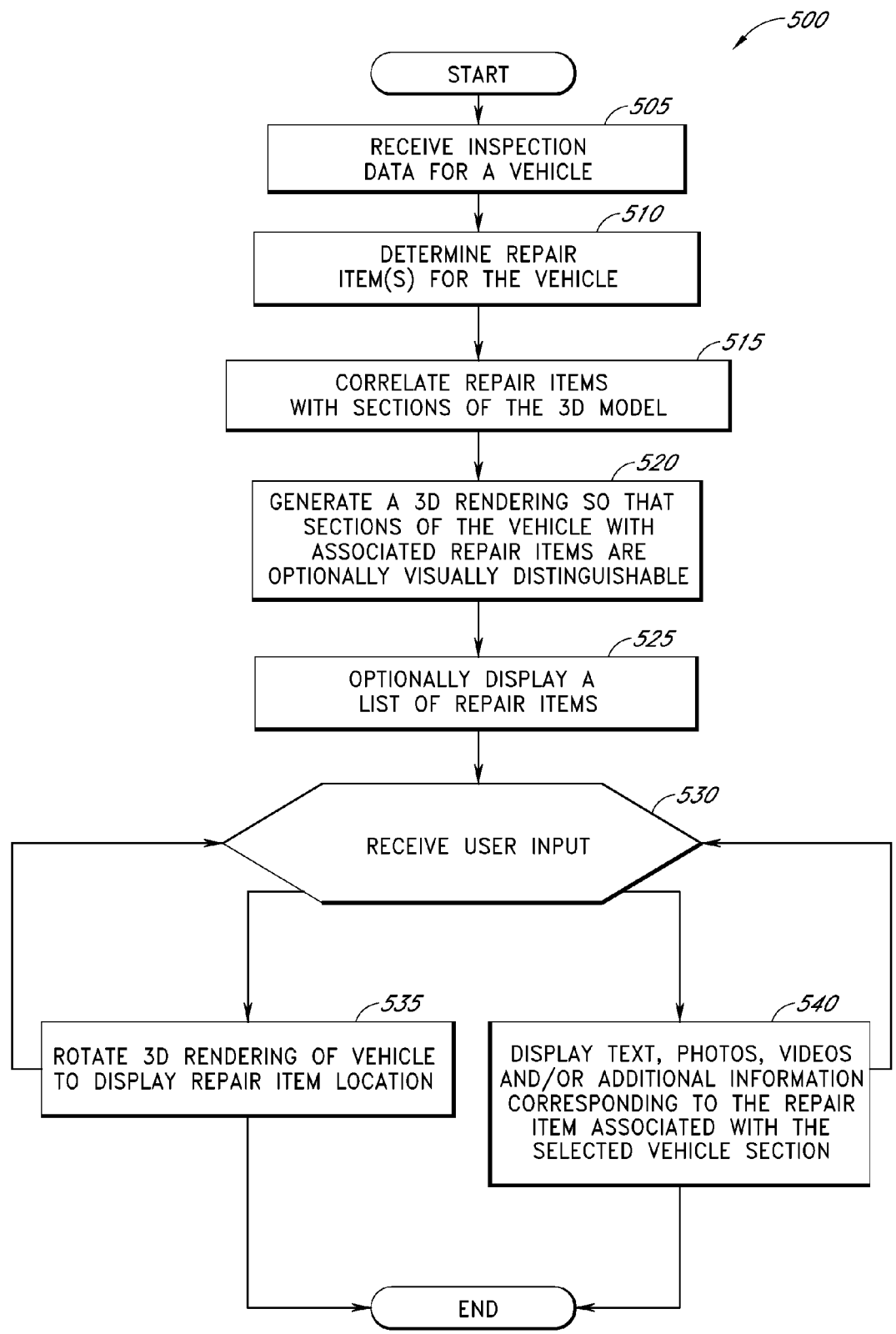
FIG. 5 illustrates a flow chart of an embodiment of a 3D model generation process.

FIG. 5 illustrates a flowchart of an embodiment of a process 500 of generating an interactive 3D user interface. The process can be used, for example, by the visual reporting system 100 or other portions of the systems illustrated in FIG. 1. Depending on the embodiment, the process of FIG. 5 may include fewer or additional blocks and/or the blocks may be performed in a different order than is illustrated. Software code configured for execution on a computing device in order to perform the method of FIG. 5 may be provided on a computer readable medium, such as a compact disc, digital video disc, flash drive, or any other tangible medium. Such software code may be stored, partially or fully, on a memory device of the computing device, such as the visual reporting system 100, in order to perform the method outlined in FIG. 5 by those respective devices. For ease of explanation, the method will be described herein as performed by the visual reporting system 100; however, the method may be performed wholly or partially by any other suitable computing device or system. For example, the visual reporting system 100 can generate the 3D inspection report and provide the report to the user computing device 170, which then allows the user to manipulate the report without additional input from the visual reporting system 100.

Beginning at block 505, the visual reporting system 100 receives inspection data, such as repair or inspection information, for a vehicle. The inspection data can originate from an inspection of the vehicle at a repair facility. For example, the technician can go through an inspection checklist, determine recommended repairs, and provide the recommended repairs to the visual reporting system 100. In another example, the technician can connect an automotive code reader/scanner to the vehicle (e.g. On-Board Diagnostic (OBD) I or OBD II scanner), receive trouble codes, and provide those codes to the visual reporting system 100. Inspection data can also come from records of previous inspections, including previously identified, but unresolved repair items.

Next, at block 510, the visual reporting system 100 determines one or more repair items, which can include repair or inspection items, for the vehicle. The visual reporting system 100 can identify recommended repairs or items requiring further inspection based on the inspection data. In one embodiment, the repair items are received in block 505, e.g. from the repair facility, such that the method does not include block 510.

Next, at block 515, the visual reporting system 100 correlates repair items with one or more sections of a 3D model of the vehicle, where the sections correspond to sections of the vehicle, such as front, side, rear, engine, trunk, interior, or the like. In one embodiment, the visual reporting system 100 accesses the 3D model by retrieving a stored model or generating a 3D model that is usable to render 3D graphical images of a vehicle. The 3D model can be a generic vehicle model or can correspond to the inspected vehicle or to a class of vehicles including the inspected vehicle. The visual reporting system 100 can then associate a repair item with a particular section of the vehicle. In some embodiments, the visual reporting system 100 can associate the repair item with individual vehicle components, allowing components to correspond to vehicle sections.

Next, at optional block 520, the visual reporting system 100 generates a 3D rendering of the vehicle with sections of the vehicle having associated repair items are visually distinguishable. For example, sections with repair items may be highlighted, colored differently, outlined, or otherwise marked to distinguish sections with the repair items from other sections. In one embodiment, sections with repair items may be marked to further distinguish a section from other sections with repair items. For example, the sections may be distinguished based on priority of repair, cost of repair, current status of the repair item, estimated repair time, or other metric.

Next, at optional block 525, the visual reporting system 100 provides a reporting list of repair items with the interactive 3D user interface. The reporting list can provide a second navigation interface for the user, in addition to the 3D rendering. For example, the user can select an entry on the list, causing the 3D rendering to be rotated or otherwise changed in order to display a view of the 3D rendering corresponding to the selected entry.

Next, at block 530, the visual reporting system 100 receives an input from the user. As will be apparent, various types of input from input devices such as a touch screen, keyboard, mouse, or the like can be received by the visual reporting system 100, which can cause a variety of responses from the visual reporting system 100. For example, the input can be a selection by the user of a repair item or vehicle section from the inspection report or the current 3D rendering.

In another example, the input comprises hovering, clicking or double clicking a section of the vehicle. The input can also be a "grab and drag" of the 3D rendering in order to rotate the view to a different orientation. Depending on the user input, the visual reporting system 100 can proceed to block 535 or block 540.

Moving to block 535, the 3D rendering of the vehicle is updated, in response to the user input, by rotating or changing views to display a repair item location based on the user selection. In one embodiment, the user input comprises the user clicking or selecting a vehicle section or repair item on an inspection report. For example, if the user selects the front section of the vehicle or a repair item associated with that section on an inspection report or other list, then the 3D rendering may be rotated to show a front view or front perspective view of the vehicle. After changing the view of the 3D rendering to a different orientation, the user interface can receive further user input, proceeding back to block 530, or the process 500 can end, for example, if the user finishes viewing the user interface.

Moving to block 540, the 3D inspection report responds to the user input by displaying text, photographs, videos, and/or additional information related to the repair item(s) associated with the selected vehicle section. In one embodiment, the user input comprises a user selection made by double-clicking, hovering a mouse pointer, or selecting a vehicle section or vehicle component on the current 3D rendering or a repair item on an inspection report, for example. In one embodiment, the user interface can display a popup window with additional details about a repair item or vehicle section or component, such as an estimate, status, instructional video, inspection photographs, and/or other inspection data in response to the user input. After displaying the inspection data, the user interface can receive further user input, proceeding back to block 530, or the process 500 can end.

In one embodiment, the visual reporting system 100 receives input from the user comprising indicating one or more repair decisions. For example, the user can select which repair items he wants to proceed with and provide that information to the visual reporting system 100. The visual reporting system 100 can then provide that selection to the repair facility 160 so that the repair facility can proceed with the repair. In one embodiment, the visual reporting system 100 may also request and receive payment information from the user, which can be paid via credit card or other payment method.

Figure 6:
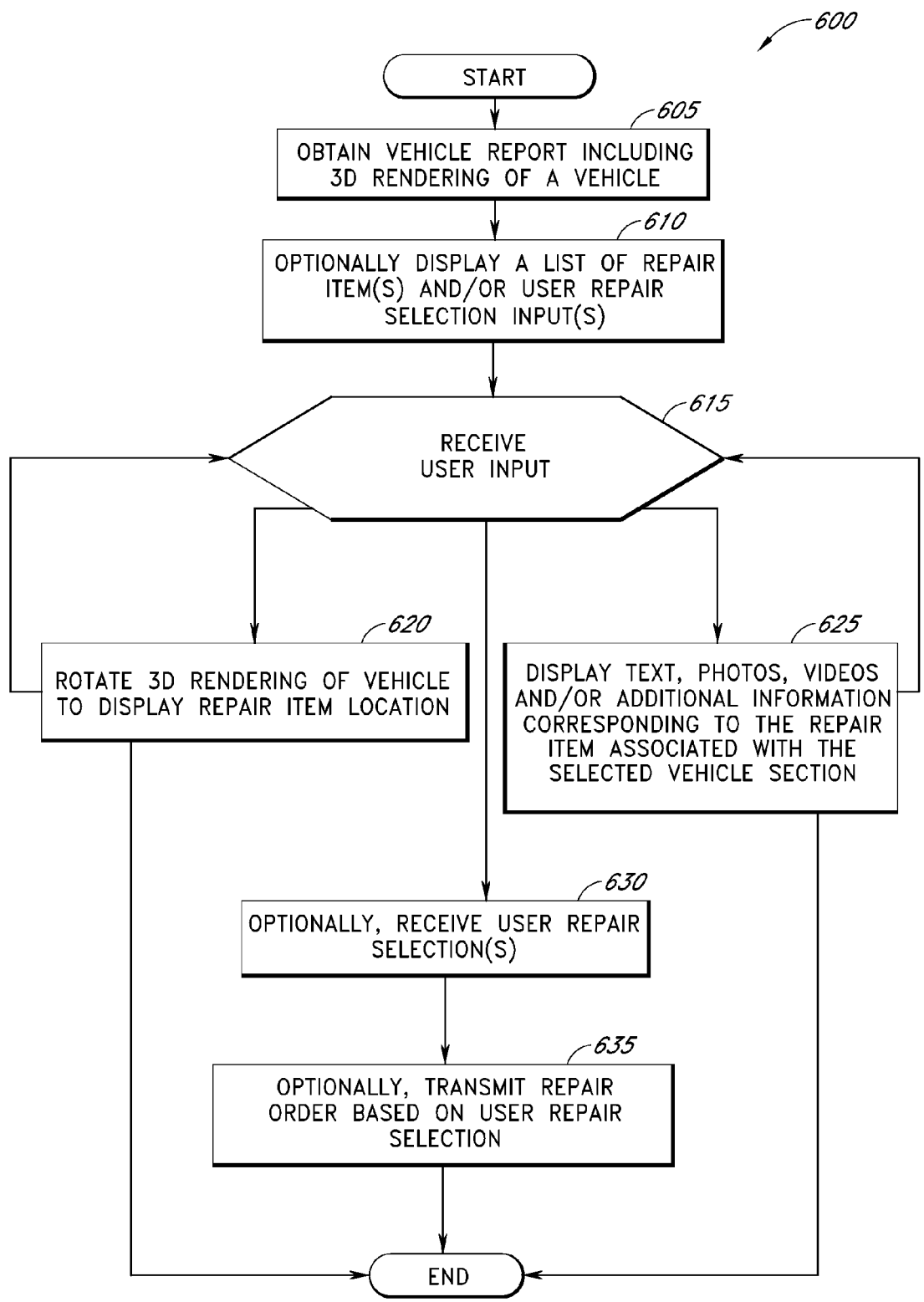
FIG. 6 illustrates a flow chart of an embodiment of a 3D model display process.

FIG. 6 illustrates a flow chart of an embodiment of a process 600 of generating an interactive 3D user interface. The process can be used, for example, by the user computing device 170 or other portions of the systems illustrated in FIG. 1. Depending on the embodiment, the process of FIG. 6 may include fewer or additional blocks and/or the blocks may be performed in a different order than is illustrated. Software code configured for execution on a computing device in order to perform the method of FIG. 6 may be provided on a computer readable medium, such as a compact disc, digital video disc, flash drive, or any other tangible medium. Such software code may be stored, partially or fully, on a memory device of the computing device, such as the user computing device 170, in order to perform the method outlined in FIG. 6 by those respective devices. For ease of explanation, the method will be described herein as performed by the user computing device 170; however, the method may be performed wholly or partially by any other suitable computing device or system.

Beginning at block 605, the user computing device 170 obtains a 3D interactive user interface including a 3D rendering of a vehicle. The user interface can be provided using data usable to render a 3D graphical image of a vehicle representative of the particular vehicle. In one embodiment, the user computing device 170 accesses the 3D interactive user interface using a web browser. In other embodiments, the 3D interactive user interface may be accessed through other mechanism, such as in an application that executes on a mobile computing device. The interactive user interface may be hosted on a website on a web server. In one embodiment, the user logs into a website in order to access the interactive user interface, in order to keep the inspection report data secure. The user may login using a username and password, or using other information, such as information regarding the inspected vehicle and possibly the inspection date.

Next, at optional block 610, the user computing device 170 can display a list and/or 3D rendering of a vehicle that includes information regarding one or more repair items. The 3D interactive user interface can also include selection inputs for receiving a user decision regarding the repair item. For example, the user can reject or approve a recommended repair.

Next, at block 615, the user computing device 170 receives a user input from the user. The user input can cause the inspection report to display a different view of the 3D rendering, provide additional inspection data, or transmit a repair order. Depending on the user input received, the user computing device can proceed to block 620, 625 or 630.

Moving to block 620, the 3D rendering of the vehicle responds to the user input by rotating or changing views to display a repair item location based on the user selection. In one embodiment, the user input comprises the user clicking or selecting a vehicle section on the model or a repair item on the inspection report. For example, if the user selects the front section of the vehicle or a repair item associated with that section, then the 3D rendering rotates to show a front view or front perspective view of the vehicle. After changing the view of the 3D rendering to a different orientation, the interactive user interface can receive further user input, proceeding back to block 615, or the process 600 can end, for example, if the user finishes viewing the report.

Moving to block 625, the 3D interactive user interface responds to the user input by displaying text, photographs, videos, and/or additional information corresponding to the repair item associated with the selected vehicle section. In one embodiment, the user input comprises a user selection made by double-clicking, hovering a mouse pointer, or selecting a vehicle section on the model or a repair item on the list. For example, the interactive user interface can display a popup window with additional details about a repair item, such as an estimate, status, instructional video, inspection photographs, and/or other inspection data. After displaying the inspection data, the interactive user interface can receive further user input, proceeding back to block 615, or the process 600 can end.

Moving to block 630, the user computing device 170 receives one or more user repair decisions. In one embodiment, the user fills out an entry field, checks a box, or otherwise selects a repair item. These user decisions can be used to generate a repair order specifying which repair items the user wishes to repair. The user computing device 170 can also request a payment authorization, such as a credit card, in order for the visual reporting system 100 to process the repair order.

Next, at optional block 635, the user computing device 170 transmits the repair order to the visual reporting system 100. The visual reporting system 100 can then provide the repair order to the repair facility handling the particular vehicle. Technicians at the repair facility can then implement the repairs selected by the user. After block 640, the process 600 can end.

While the visual reporting system 100 has been described in reference to vehicles and/or inspection and/or repair facilities, it will be apparent that the systems and processes described above can be useful in a variety of situations. For example, the visual reporting system 100 can be used with any type of vehicle as well as with during other types of inspections, for example, building inspections, product inspections, reviews of prototypes, or similar activities.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the disclosure described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of generating an interactive user interface associated with a vehicle inspection for presentation to a user, the method comprising:

receiving, by a computing system, vehicle inspection data for a particular vehicle, the vehicle inspection data including one or more recommended repairs for the vehicle;

generating a 3D graphical image of a vehicle that is representative of the particular vehicle, wherein the 3D graphical image of the vehicle includes a plurality of vehicle sections;

associating, by the computing system, respective recommended repairs with one or more vehicle sections;

transmitting, by the computing system, to a user computing device, an interactive user interface including an inspection report listing at least some of the recommended repairs, the 3D graphical image of the vehicle, and indications on the 3D graphical image of the vehicle of vehicle sections having associated recommended repairs, updating the 3D graphical image to depict different orientations of the vehicle in response to input from the user computing device;

in response to updating the 3D graphical image to depict a first orientation of the vehicle, updating the inspection report to include a first subset of recommended repairs associated with a first subset of vehicle components viewable in the 3D graphical image at the first orientation; and in response to updating the 3D graphical image to depict a second orientation of the vehicle, updating the inspection report to include a second subset of recommended repairs associated with a second subset of vehicle components viewable in the 3D graphical image at the second orientation.

2. The method of claim 1, further comprising associating related inspection data to at least one repair item included in the inspection report, wherein a selection on the user computing device of the at least one repair item causes the related inspection data to be presented on the user computing device.

3. The method of claim 2, wherein the related inspection data comprises at least one of an instructional video about the at least one repair item and an inspection image of the at least one repair item.

4. The method of claim 3, wherein the related inspection data further comprises at least one of a repair estimate and an item status.

5. The method of claim 1, wherein the input from the user computing device comprises a selection of a vehicle section.

6. The method of claim 1, wherein the input from the user computing device comprises a selection of a repair item from the inspection report listing at least some of the recommended repairs.

7. A method of providing an interactive user interface associated with a vehicle inspection to a user, the method comprising:

receiving on a computing device, from a reporting system, an interactive user interface including an inspection report listing at least some recommended repairs and a 3D graphical image of a vehicle that is representative of an inspected vehicle;

updating the 3D graphical image to depict different orientations of the vehicle in response to input received on the user computing device;

in response to a first input updating the 3D graphical image to depict a first orientation of the vehicle, updating the inspection report to include a first subset of recommended repairs associated with a first subset of vehicle components viewable in the 3D graphical image at the first orientation; and in response to updating the 3D graphical image to depict a second orientation of the vehicle, updating the inspection report to include a second subset of recommended repairs associated with a second subset of vehicle components viewable in the 3D graphical image at the second orientation.

8. The method of claim 7, wherein in response to receiving a selection of a repair item on the user interface, displaying a popup window having inspection data related to the selected repair item, the inspection data comprising at least one of an instructional video about the repair item and an inspection image of the selected repair item.

9. The method of claim 8, wherein the inspection data further comprises a repair estimate or a status of the selected repair item.

10. The method of claim 7, wherein repair items are indicated on the 3D graphical image using a plurality of indicators, wherein a first indicator indicates a low priority repair and a second indicator indicates a high priority repair.

11. The method of claim 10, wherein the first indicator is a first color and the second indicator is a second color.

12. The method of claim 7, wherein the user input comprises a selection of a repair item on the 3D graphical image.

13. The method of claim 7, wherein the first input or second input comprises a selection of a repair item on a repair list associated with the 3D graphical image, wherein the repair list includes one or more repair items associated with the 3D graphical image.

14. A system for generating an interactive user interface associated with a vehicle inspection, the system comprising:
  a 3D modeling module configured to generate an interactive user interface including an inspection report listing at least some of the recommended repairs and a 3D graphical image of a vehicle that is representative of an inspected vehicle, the 3D graphical image having a plurality of graphical vehicle sections corresponding to physical vehicle sections of the inspected vehicle;
  an inspection interface configured to receive inspection data for the inspected vehicle, the inspection data comprising recommended repair items corresponding to vehicle components of the inspected vehicle; and
  an association module configured to associate the repair items with the graphical vehicle sections, wherein a repair item is associated with a graphical vehicle section based on the proximity of the vehicle component corresponding with the repair item to the physical vehicle section corresponding to the graphical vehicle section;
  wherein the 3D graphical image is configured to depict different orientations of the vehicle in response to input from a user computing device;
  wherein a first input causes the 3D graphical image to depict a first orientation of the vehicle and causes the inspection report to update by including a first subset of recommended repairs associated with a first subset of vehicle components viewable in the 3D graphical image at the first orientation;
  wherein a second input causes the 3D graphical image to depict a second orientation of the vehicle and causes the inspection report to update by including a second subset of recommended repairs associated with a second subset of vehicle components viewable in the 3D graphical image at the second orientation.

15. The system of claim 14, wherein graphical vehicle sections on the 3D graphical image having associated repair items are indicated on the 3D model.

16. The system of claim 14, further comprising the interactive user interface, wherein the interactive user interface is configured to receive a repair order specifying one or more repair items selected by a user for repair.

17. The system of claim 14, wherein graphical vehicle sections having associated repair items are configured to display inspection data related to the associated repair items in a popup window upon selection.

18. Physical computer storage having stored thereon instructions that, in response to execution by a computing system having one or more hardware processors, cause the computing system to:
  receive vehicle inspection data for a particular vehicle, the vehicle inspection data including one or more recommended repairs for the vehicle;
  generate a 3D graphical image of a vehicle that is representative of the particular vehicle, wherein the 3D graphical image of the vehicle includes a plurality of vehicle sections;
  associate respective recommended repairs with one or more vehicle sections; and
  transmit to a user computing device, an interactive user interface including an inspection report listing at least some of the recommended repairs, the 3D graphical image of the vehicle, and indications on the 3D graphical image of the vehicle of vehicle sections having associated recommended repairs,
  wherein the 3D graphical image is configured to depict different orientations of the vehicle in response to input from the user computing device;
  wherein a first input causes the 3D graphical image to depict a first orientation of the vehicle and causes the inspection report to update by including a first subset of recommended repairs associated with a first subset of vehicle components viewable in the 3D graphical image at the first orientation;
  wherein a second input causes the 3D graphical image to depict a second orientation of the vehicle and causes the inspection report to update by including a second subset of recommended repairs associated with a second subset of vehicle components viewable in the 3D graphical image at the second orientation.

* * * * *